United States Patent [19]

Winkler

[11] Patent Number: 4,547,197
[45] Date of Patent: Oct. 15, 1985

[54] TREATMENT OF BRINE ELUTRIATE

[75] Inventor: Robert Winkler, Wallisellen, Switzerland

[73] Assignee: Sulzer-Escher Wyss Ltd., Zurich, Switzerland

[21] Appl. No.: 559,101

[22] Filed: Dec. 7, 1983

[30] Foreign Application Priority Data

Dec. 23, 1982 [CH] Switzerland ............... 7518/82

[51] Int. Cl.⁴ .................................. B01D 9/02
[52] U.S. Cl. ................... 23/302 T; 23/302 R;
23/303; 423/179; 423/499; 423/551
[58] Field of Search ............... 423/179, 203, 499, 551,
423/188; 23/302 R, 302 T, 303, 296, 297

[56] References Cited

U.S. PATENT DOCUMENTS

| 3,384,459 | 5/1968 | Carter et al. | 23/303 |
| 3,712,797 | 1/1973 | Winkler | 23/303 X |
| 4,140,747 | 2/1979 | Sadan | 423/203 X |
| 4,180,547 | 12/1979 | Chirico | 23/302 T |
| 4,306,880 | 12/1981 | Garrett | 23/302 T |

Primary Examiner—Thomas Wyse
Attorney, Agent, or Firm—Robert A. Ostmann

[57] ABSTRACT

The invention relates to the treatment of brine and more particularly the treatment of the brine elutriate drawn off after evaporation of the brine at an elevated temperature to separate some of the sodium chloride thereon. The crude brine normally contains sodium sulphate and potassium chloride, sometimes to relatively high levels, and the invention is directed primarily at the separation out of these salts. To achieve this, the brine elutriate is cooled, in chamber (12) whereby an NaCl—/KCl—/-Na$_2$SO$_4$— salt mixture is separated off by crystallization. The remaining parent solution can be returned to the evaporation stage (10), without disturbing the equalized balance of the secondary salts in the brine to be processed. The NaCl present in the salt mixture can be recovered by deposition with refrigerated water and separation of the Na$_2$SO$_4$.

6 Claims, 1 Drawing Figure

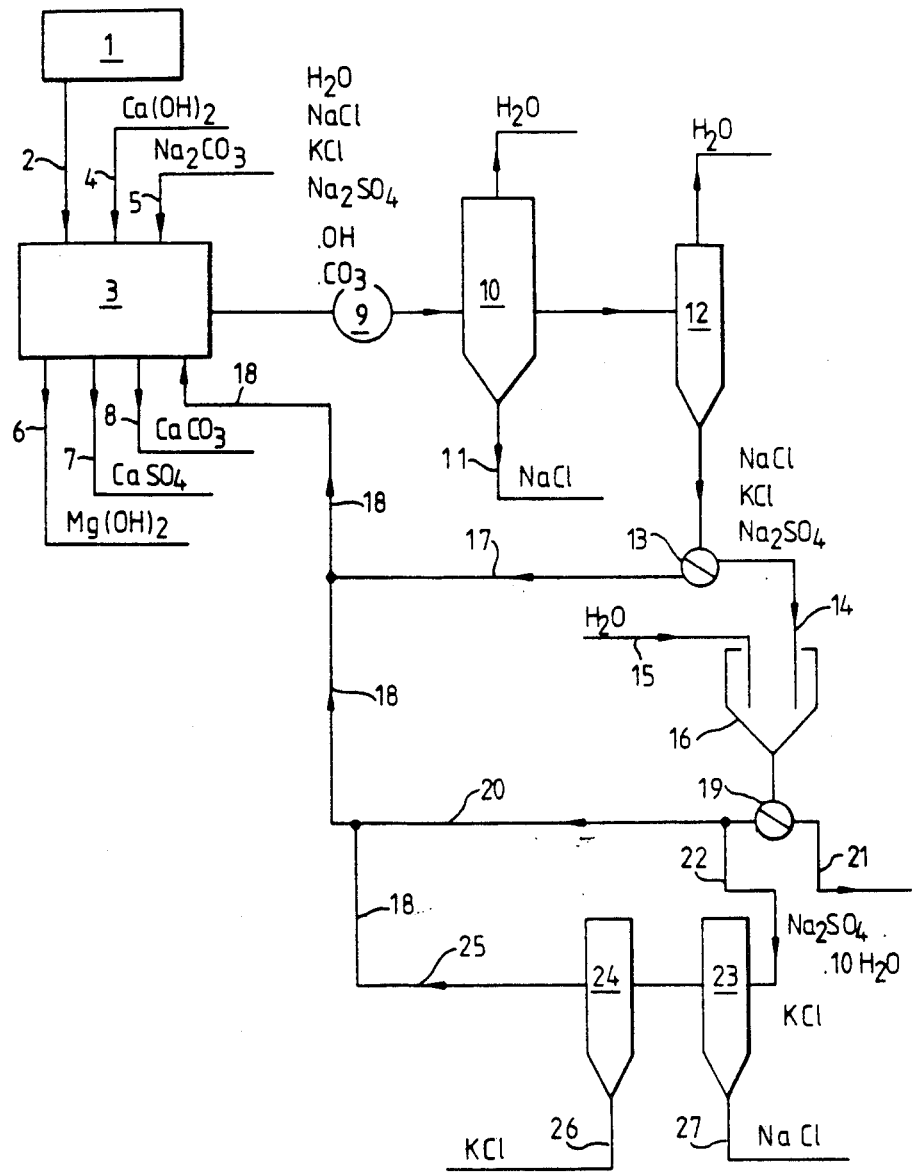

TREATMENT OF BRINE ELUTRIATE

BACKGROUND TO THE INVENTION

The invention relates to the treatment of brine containing sodium sulphate ($Na_2SO_4$) and potassium chloride (KCl) content in solution. Particularly it relates to a treatment of brine elutriates after evaporation treatment to extract some of the sodium chloride (NaCl) in the brine. Such elutriates have considerable levels of sodium sulphate and potassium chloride in solution.

In the extraction of sodium chloride from natural deposits a method is used which consists of dissolving out the salt deposits by the addition of water, and of evaporating an almost saturated crude brine thus obtained following conventional purification, in order to crystallize out the dissolved sodium chloride. The crude brine produced in the dissolving step and which is to be processed usually contains further secondary components in addition to NaCl, which on the one hand may be undesirable in the crystallized product, the NaCl, and on the other hand may lead to intrusive incrustations (boiler scale) on the apparatus, heat transmission surfaces and pipe ducts in the evaporation process.

The so-called hardness-causing salts can be removed from the crude brine by chemical pretreatment, in a purification stage in which magnesium is precipitated as hydroxide and calcium as carbonate. Components of higher solubility, such as for example, sulphates and potassium compounds, remain in the purified brine solution.

To prevent the crystallization of the higher solubility components with the sodium chloride in the evaporation stage, the stage is controlled such that the concentration of the higher solubility components remains below their saturation. As a result no crystallization and no mixing with the product, the sodium chloride, takes place. To achieve this an evaporation ratio is adhered to from which a permanent residual solution or parent solution results. The parent solution contains components which are not to be crystallized, with a residual content of sodium chloride. Whether the evaporation process takes place continuously or in stages, the parent solution is drawn off as elutriate.

For sulphate the permissible threshold concentration in the above treatment is dependent on the operation temperature; e.g., 4.5% at 100° C. approximately, and 5.2% at 50° C. approximately, as $Na_2SO_4$ at the same time in addition approximately 26% or 24% NaCl respectively will be in solution.

The parent solution, or brine elutriate, is drained off in more simple methods or conveyed to another use. According to known methods the salting out effect is used which, by the admixture of easily soluble sulphates leads to precpitation of $CaSO_4$. For this purpose, the parent solution which is almost saturated in $Na_2SO_4$ can be mixed with the crude brine which is to be purified and a salting-out effect, with precipitate of $CaSO_4$, is brought about.

Insofar as in the above treatment of the elutriate the sulphate content in the crude brine is contained to the extent of the calcium sulphate solubility, a balanced condition will arise between brine purification, evaporation and elutriate, and the available brine can be practically fully utilized, in which the brine elutriate is returned and is subjected once more to evaporation. However, if the sulphate content in the crude brine is higher; i.e., above the calcium sulphate solubility, then no equalized balance will arise and a part of the sulphate must be removed from the system, either by discarding a part of the elutriate brine, or by precipitation of a sulphate content by cooling in the range of the Glauber's salt phase; i.e., for example to 0° C., or by chemical treatment, for example calcium chloride ($CaCl_2$)—admixture. The balance of the sulphate introduced with the crude brine and elutriate must be equalized.

If the crude brine also contains a proportion of potassium chloride (KCl), then this component will accumulate in the above methods and finally will crystallize out with the NaCl and may be considered as an undesired constituent part. To prevent this, a part of the elutriate is discarded in a quantity such that the balance of introduced and elutriated potassium is equalized.

In order to avoid the above-mentioned loss of NaCl in the elutriate brine which is to be discarded, known methods consist of precipitating out the sodium sulphate for the most part through the addition of calcium chloride ($CaCl_2$) and through evaporation at a high temperature (e.g. 120° C.), and again crystallizing out NaCl until almost the saturation of KCl is reached. Additionally, as is known from the potassium industry, by temperature lowering KCl can be crystallized out and thereafter once more NaCl can be crystallized out by further evaporation in the higher temperature range. Whatever the case may be, in the end a residual quantity, which is again enriched with sodium sulphate, is either discarded or, if required, may be returned into the brine purification process. The disadvantage of this method lies in that an additional chemical treatment is necessary, requiring calcium and sodium carbonate and corresponding apparatus.

SUMMARY OF THE INVENTION

The invention is directed at a treatment of brine elutriate of the type described, in which the excess secondary salts, namely sulphates and KCl, are removed from the elutriate, so that the separated solution can be returned for renewed evaporation without disturbing the balance of the secondary salts. In this way, a maximum proportion of the NaCl present in the crude brine can be extracted as a product through evaporation. Advantageously, the treatment is to be carried out in a simple manner and without the addition of supplementary chemicals. According to the invention the drawn off elutriate with NaCl, KCl— and $Na_2SO_4$— content, is cooled for the simultaneous crystallization of the three salts and the precipitated $NaCl/KCl/Na_2SO_4$ salt mixture is separated from the parent solution. Advantageously the cooling of the elutriate takes place by flash evaporation.

The invention also provides a process for treating crude brine containing sodium sulphate and potassium chloride in solution in addition to sodium chloride, which method comprises extracting a portion of the sodium chloride from the brine in an evaporation stage, and treating the elutriate comprising the residual solution in accordance with the above method.

The parent solution, which is separated off after cooling, can be used as an addition to the crude brine which is to be processed. To utilize the remaining salt content the salt mixture, can be deposited with refrigerated water in the range of the Glauber's salt-phase for separation of the decahydrate-residue and of the potassium chloride from the parent solution.

With a simultaneous excess of sulphate and potassium, and corresponding proportions of both components, a simultaneous crystallization occurs in the method of the invention as the elutriate brine is cooled after drawing off from the evaporator. If an elutriate brine is cooled, for example, from 118° C. to 45° C. by flash evaporation, the following conditions arise:

| Elutriate g/kg 118° | Expansion Vapour resp. salt precipitate | Residual solution 45° |
|---|---|---|
| $Na_2SO_4$ 46.0 | 14 | 32 |
| KCl 120 | 25 | 95 |
| NaCl 181 | 27 | 154 |
| $H_2O$ 653 | 103 | 550 |

Through corresponding adjustment of the concentration of secondary salts in the pure brine and expedient selection of the expansion gradient it is therefore possible to separate off the secondary salts which are introduced with the crude brine and to arrive at an equalized balance of the secondary salts in the brine which is to be processed. Thus, the advantages of the return of the parent solution into the brine purification process can be utilized, without a portion of the NaCl having to be discarded.

The salt residue from the flash evaporation contains, according to the above example, in addition to the secondary salts which are to be separated, a proportion of NaCl, which is to be considered as a loss if the residue is discarded. By comparison, however, the parent solution to be discarded would contain per kg secondary salt at the same time 2.6 kg NaCl, whilst with the salt residue only approximately 0.7 kg NaCl would be given up. If in addition the shift in the $KCl/Na_2SO_4$ proportion of the resulting pure brine is taken into account, which occurs between the process with discarding of the elutriate brine and that with discarding of the expansion salt, then there even results a ratio in the NaCl losses of approximately 1:7.8 in favour of the second proposed method.

We have found also that the salt mixture can be processed to a large extent from the flash evaporation described above. For example, the mixture may be mixed with cold water (e.g. at 5° C.), whereby the entire NaCl and in addition selectively the whole, or a part, of the KCl is dissolved, whilst only a very small part; e.g. 2% of $Na_2SO_4$ goes into solution. By evaporation at an increased temperature; (e.g. 120° C.) NaCl can be crystallized out again from this solution, and on reaching the saturation range of KCl, this can be brought again to precipitation by cooling, or respectively by renewed flash evaporation. Alternatively, insofar as the KCl is only dissolved to a restricted extent, the acquired solution may also be returned to the brine purification process, in order to convey it to the evaporation process together with the pure brine current. The quantity of elutriate and the original temperature in the flash evaporation are then to be adjusted to the easily altered ratios.

BRIEF DESCRIPTION OF THE DRAWING

The invention will now be described by way of example with reference to the accompanying drawing, which shows schematically a plant for the recovery of sodium chloride from NaCl— crude brine using the inventive technique.

DESCRIPTION OF A PREFERRED EMBODIMENT

Crude brine generated by dissolving the natural deposits with water emerges from a bore hole 1. In addition to the approximate 25% NaCl which is to be recovered, the brine also contains parts of potassium chloride (KCl), sodium sulphate ($Na_2SO_4$), magnesium sulphate ($MgSO_4$) and calcium sulphate ($CaSO_4$). The crude brine arrives via a duct 2 to the crude brine purification section 3, where it is mixed via a duct 4 with calcium hydroxide ($Ca(OH)_2$) and via a duct 5 with soda ($Na_2SO_3$). Magnesium hydroxide ($Mg(OH)_2$) is precipitated out of the solution at 6, calcium sulphate ($CaSO_4$) at 7, and calcium carbonate ($CaCO_3$) at 8.

The brine, thus purified, at 9 contains KCl and $Na_2SO_4$ in addition to the NaCl. The purified brine is subjected to evaporation treatment at 10, at which the concentration of the components of higher solubility remains below their saturation. Water ($H_2O$) is extracted as steam from this solution and a major part of the NaCl is extracted as a crystallized product. The residue is withdrawn after the evaporation as brine elutriate.

The brine elutriate contains the residual part of the NaCl and the proportion of KCl and $Na_2SO_4$ which have remained in the solution during the evaporation. The elutriate brine is withdrawn at an elevated temperature which corresponds to the processing temperature of the evaporation. It is then cooled in a cooler, preferably by flash evaporation in chamber 12, to 45°–55° C., whereby so much $NaCl/KCl/Na_2SO_4$-mixture is separated off by crystallization that the parent solution, which is separated off at a separator 13 can be returned via ducts 17 and 18 as admixture the crude brine which is to be processed in purifier 3, whilst maintaining an equalized balance of the secondary salts.

The salt mixture, crystallized out by cooling at 12 and accumulating on separation at 13, contains the residue of the NaCl content and also residues of the KCl— and of the $Na_2SO_4$ content. In order to also recover the NaCl residue, the salt mixture is carried through a duct 14 to a deposition section 16, where through the addition of refrigerated water 15 the salts, particularly NaCl, are again dissolved. A portion of the $Na_2SO_4$ remains as residue in the range of the Glauber's salt phase and is separated off at the separator 19. The parent solution separated here with the dissolved NaCl— and KCl— component can be returned via ducts 20 and 18 back to the brine which is to be evaporated and the residual NaCl can be recovered as a product at the evaporation stage 10.

In order to recover or separate the residual KCl content or the residual NaCl content in the parent solution separated at 19, the parent solution present at 19 may, if desired, be carried via a duct 22 to an evaporation section 23, where at an elevated temperature the residual NaCl is crystallized out. Subsequently the solution is passed on for cooling in a flashing chamber 24, where the residual KCl is crystallized out. The residual solution remaining thereafter can be returned via ducts 25 and 18 as admixture to the brine which is to be processed.

I claim:

1. In a method of treating sodium chloride brine wherein crude brine containing sodium sulphate and potassium chloride is purified by dissolving out some of the salts with water, the thus purified brine containing sodium sulphate and potassium chloride is subjected to evaporation at elevated temperature to precipitate sodium chloride, and the precipitated sodium chloride is separated from the hot brine elutriate, the improvement which comprises a technique for extracting sodium chloride from the hot elutriate which includes the steps of cooling the hot elutriate to a lower temperature to simultaneously crystallize sodium chloride, sodium sulphate and potassium chloride and yield a parent solution still containing those salts; separating said crystallized salts from the parent solution; and feeding parent solution freed of said separated salts back to incoming brine which is to be evaporated.

2. A method as defined in claim 1 wherein the hot elutriate is cooled by flash evaporation.

3. A method as defined in either of claims 1 and 2 including the steps of treating said separated sodium chloride, sodium sulphate and potassium chloride crystals with refrigerated water in the range of the Glauber's salt phase to yield a decahydrate residue and a secondary parent solution containing sodium chloride, sodium sulphate and potassium chloride residuals; and separating the decahydrate from the secondary parent solution.

4. A method as defined in claim 3 including the step of feeding secondary parent solution freed of said decahydrate back to incoming brine which is to be evaporated.

5. A method as defined in claim 4 including the steps of subjecting secondary parent solution freed of said decahydrate to evaporation at elevated temperature to crystallize sodium chloride; separating the thus formed sodium chloride crystals from the secondary parent solution to thereby yield a tertiary parent solution; cooling tertiary parent solution by flash evaporation to crystallize potassium chloride; and separating potassium chloride crystals from the tertiary parent solution to thereby yield a residual solution.

6. A method as defined in claim 5 including the step of feeding residual solution back to incoming brine which is to be evaporated.

* * * * *